(12) United States Patent
Kalibjian

(10) Patent No.: US 7,110,623 B1
(45) Date of Patent: Sep. 19, 2006

(54) TEMPORALLY COHERENT DEPOLARIZER AND A POLARIZATION TRANSFORMER

(76) Inventor: Ralph Kalibjian, 1051 Batavia Ave., Livermore, CA (US) 94550

( * ) Notice: Subject to any disclaimer, the term of this patent is extended or adjusted under 35 U.S.C. 154(b) by 268 days.

(21) Appl. No.: 10/763,529

(22) Filed: Jan. 23, 2004

(51) Int. Cl.
*G02B 6/34* (2006.01)
*G02B 27/28* (2006.01)
*G02B 5/30* (2006.01)
*G02F 1/01* (2006.01)

(52) U.S. Cl. .................. 385/11; 385/36; 359/251; 359/488; 359/496

(58) Field of Classification Search ............ 385/11, 385/36; 359/251, 256, 483–488, 494–496
See application file for complete search history.

(56) References Cited

U.S. PATENT DOCUMENTS

| | | | |
|---|---|---|---|
| 4,966,431 A | 10/1990 | Heismann | |
| 5,212,743 A | 5/1993 | Heismann | |
| 6,188,809 B1 | 2/2001 | Bismuth | |
| 6,421,471 B1 | 7/2002 | Shen | |
| 6,498,869 B1 | 12/2002 | Yao | |
| 6,498,889 B1 | 12/2002 | Kinoshita | |
| 6,665,106 B1 * | 12/2003 | Noe | 359/254 |
| 6,735,350 B1 * | 5/2004 | Gauthier | 385/11 |
| 2003/0007149 A1 | 1/2003 | Yamamoto | |
| 2003/0021519 A1 * | 1/2003 | Zalevsky et al. | 385/16 |
| 2003/0063833 A1 | 4/2003 | Gonthier et al. | |
| 2003/0075914 A1 | 4/2003 | Yamamoto | |
| 2003/0112436 A1 | 6/2003 | Yao | |
| 2004/0228567 A1 * | 11/2004 | Matinelli et al. | 385/11 |

OTHER PUBLICATIONS

Ralph Kalibjian; "Stckes Polarization Vector and Mueller Matrix for a Corner Cube Reflector", Optics Communications, Oct. 2004, pp. 39–68, vol. 240, Elsevier, Amsterdam, Holland.

* cited by examiner

*Primary Examiner*—Akm Enayet Ullah
*Assistant Examiner*—Jerry T Rahll

(57) ABSTRACT

A corner cube utilized for both a polarization transformer and a depolarizer requires a special glass for the corner cube. For the transformer a polarized probe beam irradiates only one facet of the corner cube off-axis to vertex, whereas for the depolarizer a circularly polarized beam irradiates all three facets symmetrically on-axis to the cube vertex. The collimated output beam from the corner cube has a hexad pattern where alternate hexads correspond to CW (clockwise) and CCW (counter-clockwise) rotations in sequential reflections from the corner cube facets. CW and CCW hexad regions comprising the depolarized beam differ in phase by $0.8\pi$ radians. A dielectric layer pattern of alternate hexads deposited on the output port of a beam director in registry to the depolarized beam pattern compensates for the leading phase of the CCW hexads thus equalizing the overall phase-front of the beam and thereby resulting in a temporally-coherent depolarized beam.

20 Claims, 6 Drawing Sheets

TEMPORALLY COHERENT DEPOLARIZER AND A POLARIZATION TRANSFORMER

BACKGROUND OF THE INVENTION

The present invention is in the field of optics for implementing a depolarizer and a polarization transformer by means of a corner-cube.

Random polarization changes occur in fiber-optic communication systems. Linearly polarized light launched into a fiber invariably experiences birefringence as it propagates through the fiber. Birefringence transforms linearly polarized light into elliptically polarized light which can compromise performance in communication systems. There are methods for minimizing adverse non-linear polarization effects. One is by means of a standard polarization transformer that converts elliptically polarized light into linearly polarized light. The second is by means of depolarization whereby the polarization states in the Stokes parameters null out. Depolarized light is not affected by birefringence in the fiber and thereby propagates without any polarization perturbations.

Historically polarization transformers have been developed to minimize adverse polarization problems in signal processing. The first transformers were fiber squeezers and mechanically rotated wave plates. More recent transformer developments have been described in U.S. Pat. Nos. 4,996,431 and 5,212,743 (Heismann, Oct. 30, 1990 and May 18, 1993). Heismann's solution is an electrically-controlled integrated optic waveguide device in a $LiNbO_3$ substrate. The device consists of three integrated waveplates with corresponding cascaded electrodes that are controlled by applied drive-voltages transforming the input polarization state into any arbitrary polarization state by TE-TM mode conversion in the $LiNbO_3$ waveguide. Standard polarization transformers based essentially on the concepts of Heismann are commercial available, for example, from Corning and USD Uniphase. Heismann's invention is a relatively expensive item because it requires specialized processing techniques for channel diffusion and lithographic printing of the pattern for the integrated-optics waveguide device. The transformer has a relatively narrow optical wavelength range as well as a limited tunability range. Another transformer has been described by Bismuth in U.S. Pat. No. 6,188,809 (Feb. 13, 2001) that utilizes a 10-cm length electro-optical rod having a 1-mm rectangular cross-section with two sets of electrodes disposed on the four facets of its cross-section. Major problems in Bismuth's invention are 1) the mechanical fragility of the device in implementing a rod having a 100:1 geometrical aspect ratio, and 2) maintaining a stable beam path aligned to the saddle point axis of the electrode fringing fields at the center of the 1-mm cross-section of the rod.

Polarization transformers of the Heismann type can be used as scramblers, otherwise known as pseudo-depolarizers. The scrambler speed has to be fast enough such that the time-averaged depolarization shows no compromising polarization effects in the processed signal at the receiver terminal of the communication link. Other types of depolarization devices are also available. Depolarization can be achieved in a birefringent medium by re-circulating a split-off portion of the output light back into the input of the birefringent medium as described in U.S. Pat. No. 6,421,471 (Shen, Jul. 10, 2002). The output polarization of the light beam averages to zero for a linear series of re-circulating loops, whereby the number of loops in the chain enhances the depolarization factor. The averaging scheme in concept is similar to the scrambler except it is entirely passive without need of electronic drivers. Fiber loops can also be used for depolarizers as described in U.S. Patent Application No. 2003/0063833 (Gonthier, et al., Apr. 3, 2003). Another method is described in U.S. Patent Application No. 2003/0007149 (Yamamoto, Jan. 9, 2003) that uses a series of birefringent plate-pairs that are bonded together such that the optical axis of each pair section is orthogonal to each other. The junction along the optical axis between the pair section is angled geometrically at 45° in order to enhance the mixing or averaging of the polarization states. The depolarization factor can be enhanced by adding more plate-pairs in the beam path resulting in a trade-off in increased throughput loss. Another application of a birefringent plate pair is described in U.S. Pat. No. 6,498,889 (Yao, Dec. 24, 2002) and U.S. Patent Application No. 2003/0112436 (Yao, Jun. 19, 2003), however, unlike Yamamoto's 45° angle junction between the plate-pairs, Yao uses a shallower angle between the plate-pair such that the phase shift across the diameter of the beam is 360°. This allows the polarization states of the beam through the plate-pair to be mapped out in a linear pattern symmetrically about the center line of the beam. Summation of the Stokes polarization parameters null out in the focused spot of the output beam which results in a depolarized beam with only one birefringent plate-pair.

In summary, current depolarization methods for narrow bandwidth lasers require scrambling of the polarization states in the refractive index either by active means in a waveguide medium or by passive means in re-circulating fiber loops or in birefringent plate pairs. Ideally, the aim in depolarization is to create a sufficient number of polarization states such that the sum of the polarization states in the Stokes parameters cancel out to zero. In the above cited patents the output beam from the various depolarizers are temporally-incoherent, thus compromising their use in some systems. It is the intent of the present invention to remedy this situation by providing for a temporally/spatially-coherent depolarizer limited only by the line-width of the laser.

BRIEF SUMMARY OF THE INVENTION

The object of my invention is to utilize a passive optical element 1) to transform polarized light into light of any arbitrary polarization state, and 2) to transform circularly polarized light into temporally coherent depolarized light. The means for achieving polarization transformation and depolarization is in the use of a corner cube reflector.

The embodiment for the standard polarization transformer is based upon a TIR (total internal reflection) glass corner cube which requires an off-axis probe beam irradiating only one facet of the corner cube at normal incidence. Any polarization state of the input beam can then be completely transformed by the corner cube to linear, circular, elliptical or to any arbitrary polarization state on the Poincaré sphere. The embodiment for the depolarizer is based upon the same TIR corner cube, however it requires a normally incident beam irradiating uniformly on-axis to all three facets of the corner cube. The output beam is completely depolarized for a circularly polarized input beam to the corner cube. A passive feature implemented on the output stage of the depolarizer provides for a temporally-coherent depolarized output beam which is not featured in the previously cited depolarizers. For both the transformer and the depolarizer an ideal glass is required for the corner cube which has a refractive index centered substantially about $n_0=1.76748$.

Further objects and advantages of the standard polarization transformer and the depolarizer will become apparent from a consideration of the drawings and ensuing description.

BRIEF DESCRIPTION OF THE DRAWINGS

FIG. 2 shows (a) the diagram for the basic standard polarization transformer, and (b) the planar projected view of the off-axis irradiated corner cube.

FIG. 3 shows (a) the diagram for the basic depolarizer, and (b) the planar projected view of the on-axis irradiated corner cube.

DETAILED DESCRIPTION OF THE INVENTION

Polarization transformers are described based upon the use of a corner cube as the primary optical element in transforming an input polarization state into a different output polarization state. Polarization refers to the orientation of the electric field of an optical wave that can be either early, circularly, or elliptically polarized. However, there is one polarization state that is called depolarization. Depolarization comprises a myriad of polarization states whose sum in the Stokes polarization parameters is equal to zero; thus, no longer is there an attribution of any polarization effects of the light wave except only for its intensity. Depolarization is a very unique polarization state. For this reason a depolarizer can also be classified as a polarization transformer; however, for its implementation the depolarizer differs in some manner from the standard polarization transformer. In this Specification to avoid confusion in the meaning of terms polarization transformer refers to either a depolarizer or a standard polarization transformer. The standard polarization transformer transforms an input polarization state into a different output polarization state exclusive of the depolarization state.

The three facets of a corner-cube comprises three mutually perpendicular planes that can be fabricated either in a solid or hollow cube configuration. The reflected output beam path (after being reflected sequentially from the trihedral planes of the cube) is always parallel to the input beam path, and for a normally incident beam to the aperture of the cube the angle of incidence i to each of the trihedral planes is i=54.7356°. The trihedral planes of the corner-cube are projected on a plane normal to the major diagonal of the cube as shown in 4 of FIG. 1. The triad sectors 1, 2, 3 are partitioned by their boundary lines BL1, BL2, BL3. $E_P$, $E_S$ in FIG. 1 (with the appropriate subscript numbers) are the incident electric field components of the light parallel and perpendicular, respectively, to the plane of incidence of the input beam to each of the triad sectors 1, 2, 3. The $E_P$ axis is an axis of symmetry where, for example, $E_{P1}$ bisects the triad sector 1 into two hexad regions in sector 1 as bounded by the lines $E_{P1}$-BL2 and $E_{P1}$-BL1 corresponding to the CCW (counter-clockwise) and CW (clockwise) rotations, respectively. For example, with a probe beam incident at any point within the hexad region bounded between lines $E_{P1}$ and BL2 in sector 1, the beam in sequential reflections from the facets propagates in the CCW direction; whereas, the probe beam shifted to any position in the adjoining region bounded between lines $E_{P1}$ and BL1 the beam propagates in the CW direction.

Figure 1:
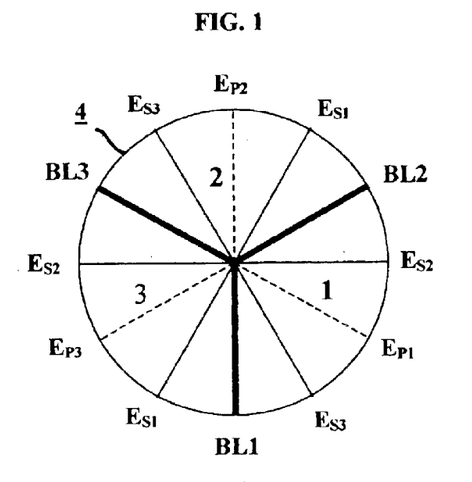
FIG. 1 shows the planar projected view of the corner cube.
Figure 2A:
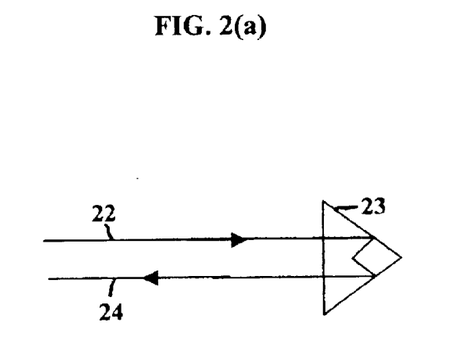
Figure 2B:
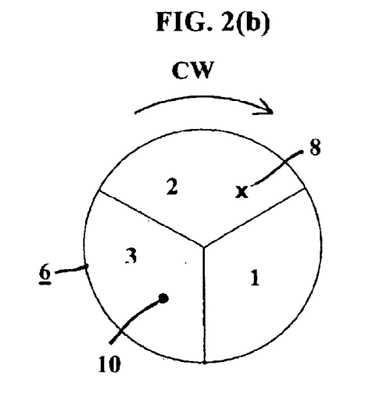

The invention for the standard polarization transformer utilizing a TIR (total internal reflection) corner cube 23 as shown in FIG. 2(a) requires a normally incident probe beam 22 irradiating off-axis to only one facet of the corner cube 23. The retro-reflected beam 24 from the corner cube 23 is the polarization-transformed beam. The planar projected view 6 of the corner cube in FIG. 2(b) shows the off-axis input probe beam 8 irradiating a spot x in sector 2. The output beam spot 10 in sector 3 is diametrically opposite from the input beam spot 8 which undergoes three sequential reflections in the CW (clockwise) direction before exiting the corner cube. The angular orientation of the polarization ellipse of the input beam is measured with respect to the $E_{S2}$ axis of the entering triad sector 2 in FIG. 1, whereas the angular orientation of the polarization ellipse of the output beam is measured with respect to the $E_{S3}$ axis of the exiting triad sector 3.

Figure 3A:
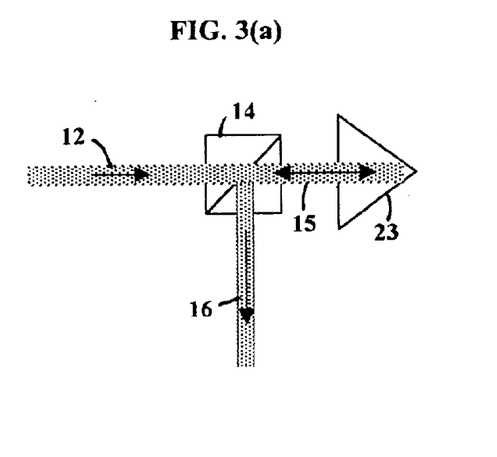
Figure 3B:
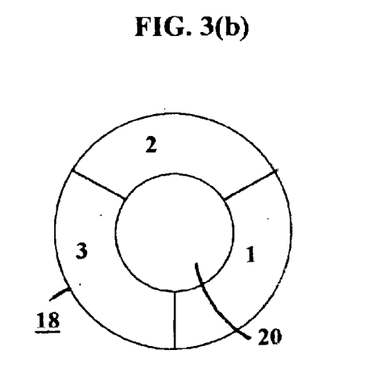

The invention for the depolarizer based upon a TIR glass corner cube 23 requires a normally incident collimated beam 12 irradiating symmetrically on-axis to the vertex of the corner cube facets as shown in FIG. 3(a). The retro-reflected depolarized beam 15 is steered, for example, by the polarization insensitive beam-splitter 14 as output beam 16. The planar projected view of the irradiated corner cube 18 is shown in FIG. 3(b) where the input/output beam 20 superimposes axially onto triad sectors 1, 2, 3.

The detailed description for the standard polarization transformer is presented first because many concepts of the transformer apply to the depolarizer as well. Importantly, the understanding of the inventions depends on the Mueller matrices of the corner cube for both standard transformer and depolarizer applications. Since the Mueller matrix of the depolarizer is derived from the matrix for the transformer, the description starts out aptly with the transformer.

A standard polarization transformer based upon the commonly used BK7 glass corner-cube has a limited ellipticity range in polarization conversion for an off-axis irradiated corner-cube, nor does it give 100% depolarization conversion for an on-axis irradiated corner-cube. However, one can show both theoretically and experimentally that there is an ideal glass for obtaining full ellipticity range in polarization conversion and 100% depolarization. This ideal glass has a refractive index $n_0$=1.76748. The Mueller matrix of a TIR (total-internal-reflection) mirror is given by $$M_R = \begin{vmatrix} 1 & 0 & 0 & 0 \\ 0 & 1 & 0 & 0 \\ 0 & 0 & v & w \\ 0 & 0 & -w & v \end{vmatrix} \quad (1)$$

where v=cos β, and w=sin β. Also, β is related to the refractive index n and the angle of incidence i where β=−54.0275° for n=$n_0$=1.76748 for the ideal glass corner cube.

For an off-axis probe beam the corner cube is utilized as a standard polarization transformer converting elliptically (linearly) polarized light to linearly (elliptically) polarized light. The Mueller matrix for the corner cube is given by $$M_{off} = \begin{vmatrix} 1 & 0 & 0 & 0 \\ 0 & b_1 & c_1 & d_1 \\ 0 & c_1 & c_2 & d_2 \\ 0 & -d_1 & -d_2 & d_3 \end{vmatrix}, \qquad (2)$$

where the matrix elements of (2) are functions of β and have values $b_1=0.69$, $c_1=-0.46$, $c_2=0.31$, $d_1=-0.56$, $d_3=-0.83$, and $d_3=0$ for $n=n_0=1.76748$ for the ideal glass corner cube. The polarization properties of the corner-cube are obtained from the output Stokes polarization vector $S'_{off}=M_{off}S$ where S is the input Stokes vector defined by the 4×1 column matrix of the Stokes polarization parameters $S_0$, $S_1$, $S_2$, $S_3$ and defined further by the polarization variables ψ and χ, $$S = \begin{vmatrix} S_0 \\ S_1 \\ S_2 \\ S_3 \end{vmatrix} = I \begin{vmatrix} 1 \\ \cos(2\psi)\cos(2\chi) \\ \sin(2\psi)\cos(2\chi) \\ \sin(2\chi) \end{vmatrix}. \qquad (3)$$

For the input beam in (3) I is the beam intensity, ψ is the angular orientation of the polarization ellipse having a range $0°<\psi<180°$, and χ is the ellipticity angle where tan(χ) is the ratio of the minor to major axis of the polarization ellipse having a range $-45°<\chi<45°$. It is important to note that only the ideal glass allows the $-45°<\chi<45°$ range whereas the commonly used BK7 glass allows only a limited range of $-38.1°<\chi<38.1°$. The ellipticity angle χ defines the shape of the ellipse, whereas ψ specifies its orientation similarly as in the Poinaré sphere. The output Stokes vector is also described by (3) when primes are attached to the parameters in (3). Substituting (2), (3) into $S'_{off}=M_{off}S$ gives the output Stokes vector $$S'_{off} = \begin{vmatrix} S'_0 \\ S'_1 \\ S'_2 \\ S'_3 \end{vmatrix} = I \begin{vmatrix} 1 \\ b_1\cos(2\psi)\cos(2\chi) + c_1\sin(2\psi)\cos(2\chi) + d_1\sin(2\chi) \\ c_1\cos(2\psi)\cos(2\chi) + c_2\sin(2\psi)\cos(2\chi) + d_2\sin(2\chi) \\ -d_1\cos(2\psi)\cos(2\chi) - d_2\sin(2\psi)\cos(2\chi) \end{vmatrix}. \qquad (4)$$

The output polarization angle ψ' is given by $$\tan(2\psi') = \frac{\pm S'_2}{S'_1} \qquad (5)$$

where the upper sign is for the CCW mode and the lower sign for the CW mode.

Figure 4:
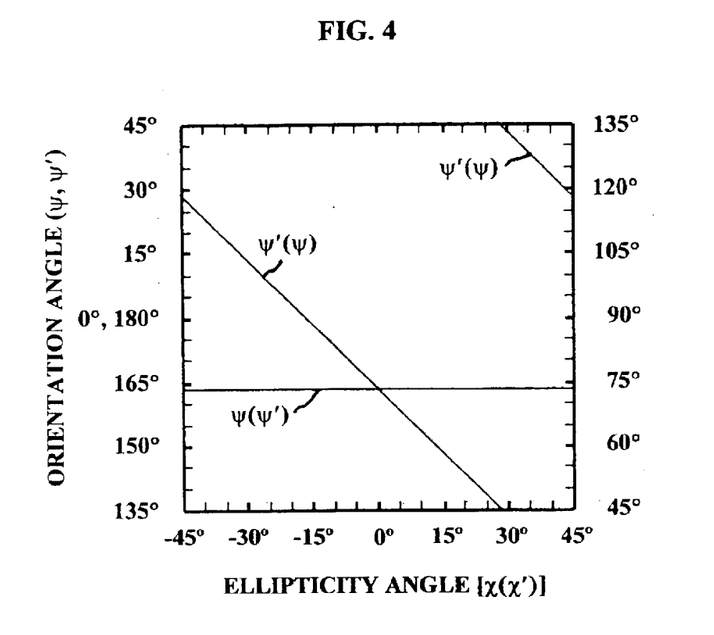
FIG. 4 shows a graph of the input and output polarization angles as a function of the ellipticity angle.
Figure 5A:
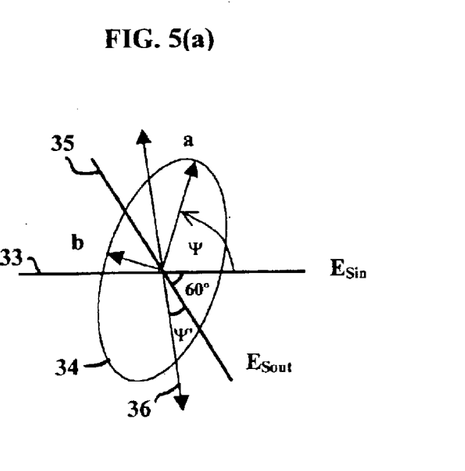
FIG. 5 shows the graphical relationship between a polarization ellipse and the corner cube orientation for the standard polarization transformer.

The transformation from an elliptically polaried light to a linearly polaried state in (4) occurs at $S'_3=0$ (for $\chi'=0$) for an input polarization orientational angle $\psi=\frac{1}{2}\arctan(-d_1/d_2)$. Substitution of the matrix element values of (2) allows the calculation of the polarization parameters in (4) and (5) which are graphed in FIG. 4 and are designated by the symbols without the parenthesis brackets. FIG. 4 shows the input/output polarization angle as a function of the input ellipticity angle χ. The input polarization angle is ψ=73.7, 163.7° (with respect to the input $E_S$ axis) and remains independent of the input ellipticity angle χ, whereas the output polarization angle ψ' (with respect to the output $E_S$ axis) varies linearly with respect to χ. Thus, any elliptically polarized input beam can be transformed completely to a linearly polarized beam by rotating the polarization ellipse orientation 73.7° (or 163.7°) with respect to one of the $E_S$ axes of the corner-cube. The linearly polarized output beam can then be nulled out with an analyzer at an output polarization angle ψ'. FIG. 5(a) shows the superposition of the polarization ellipse on the projected corner cube reference axes for a given ellipticity angle χ=arctan(b/a). The orientation of the major axis a of the input polarization ellipse 34 with respect to the $E_{Sin}$ axis 33 (corresponding to the initially irradiated facet of the corner cube) is indicated by the angle ψ=73.7°. This transforms the ellipse to a linearly polarized output beam according to FIG. 4 with an output polarization orientation angle ψ' which is the angle between the polarization orientation vector 36 of the linearly polarized output beam and the $E_{Sout}$ axis 35 of the reflecting facet of the output beam as shown in FIG. 5(a).

Figure 5B:
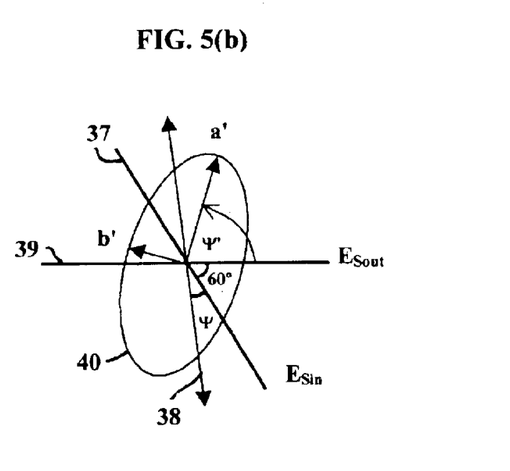

Conversely, linearly polarized light can be transformed completely to an elliptically polarized beam, this can be shown by substituting χ=0 into (4), thus yielding $$S' = \begin{vmatrix} S'_0 \\ S'_1 \\ S'_2 \\ S'_3 \end{vmatrix} = I \begin{vmatrix} 1 \\ b_1\cos(2\psi) + c_1\sin(2\psi) \\ c_1\cos(2\psi) + c_2\sin(2\psi) \\ -d_1\cos(2\psi) - d_2\sin(2\psi) \end{vmatrix} = I \begin{vmatrix} 1 \\ \cos(2\psi')\cos(2\chi') \\ \sin(2\psi')\cos(2\chi') \\ \sin(2\chi') \end{vmatrix} \qquad (6)$$

where $S'_3=\sin(2\chi')$. The input polarization angle ψ has to be adjusted for a user specified χ'. The determination of ψ from the $S'_3$ row of (8) allows the evaluation of ψ' from (5) and (6). The polarization properties can be characterized again by FIG. 4, however the parameters are now designated by the symbols within the parenthesis brackets of the figure. The polarization ellipse diagram is the same as in FIG. 5(a) except that the $E_{Sin}$ and $E_{Sout}$ axes are interchanged. The user specified χ' gives the required input polarization angle ψ from FIG. 4 as indicated in FIG. 5(b) between the input linear polarization orientation vector 38 and the $E_{Sin}$ axis 37; also, shown in FIG. 5(b) is the output polarization ellipse 40 with its major axis a' having an angle ψ'=73.7° with respect to the $E_{Sout}$ axis 39 as obtained from FIG. 4.

The on-axis symmetrical irradiated corner cube is utilized as a depolarizer, The Mueller matrix for the on-axis irradiated corner cube with the ideal glass ($n_0=1.76748$) is given by $$M_{on} = \begin{vmatrix} 1 & 0 & 0 & 0 \\ 0 & J & 0 & 0 \\ 0 & 0 & J & 0 \\ 0 & 0 & 0 & 0 \end{vmatrix} \qquad (7)$$

where J is a function of $b_1$, $b_2$, $c_2$ and has a value of J=0.56 for the ideal glass. The polarization properties of the corner cube is obtained from the output Stokes vector $$S'_{on} = M_{on}S = I \begin{vmatrix} 1 \\ J\cos(2\psi)\cos(2\chi) \\ J\sin(2\psi)\cos(2\chi) \\ 0 \end{vmatrix}. \qquad (8)$$

For a linearly polarized input beam (χ=0°) the output beam is partially polarized because $J^2<1$; however, for a circularly polarized input beam ($\chi=\pm45°$) the output beam is completely depolarized as given by $$S'_{on} = I \begin{vmatrix} 1 \\ 0 \\ 0 \\ 0 \end{vmatrix}. \qquad (9)$$

The sum of the output polarization states from the three facets of the corner cube in the Stokes polarization parameters is equal to zero; thus, in (9) the polarization effects of the light are totally absent except only for its intensity.

Figure 6A:
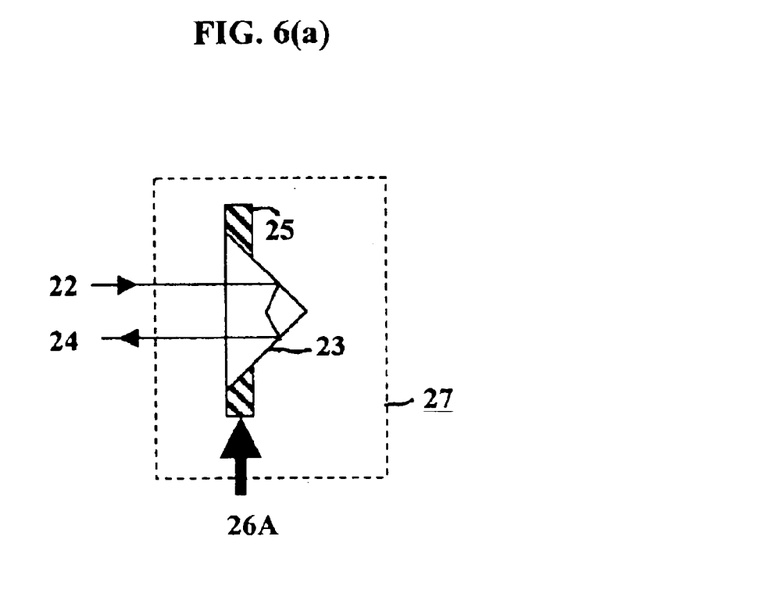
FIG. 6 shows the basic building blocks of a standard polarization transformer for an off-axis-beam irradiated corner cube.
Figure 6B:
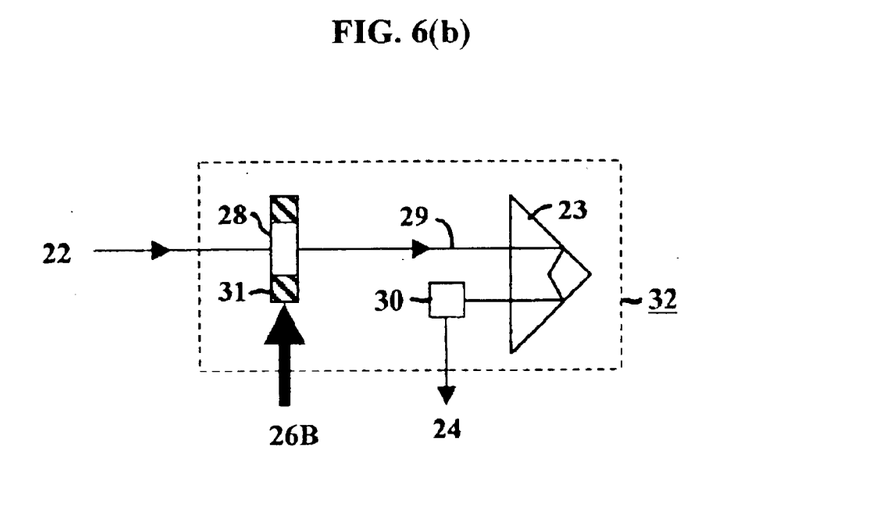

Elliptically polarized beams having a range in $\chi$ up to $\pm45°$ can be converted into linearly polarized beams by adjusting the angle $\psi$ between the major axis of the input polarization ellipse and the $E_S$ axis of the corner cube. This can be achieved in the corner-cube modules 27 in FIG. 6(a) and 32 in FIG. 6(b) which show two different standard polarization transformer configurations for rotating either the corner cube or the polarization ellipse, respectively. Both modules 27 and 32 have three similar ports: the input optical port 22, the output optical port 24, and an electrical control port 26. Common to each configuration is a corner cube 23 fabricated from the ideal glass The input probe beam is directed off-axis to the corner cube 23 in FIG. 6. FIG. 6(a) is the simplest configuration for the corner-cube module 27 having only one element, namely, a corner cube 23 in a rotatable fixture 25. The fixture 25 can be rotated either manually or driven by a motor via the control cable 26A. In this case the polarization ellipse of the input beam 22 is maintained stationary while rotating the corner cube 23 for the optimum angle $\psi$. The operational control of the optimum angle is described later with reference to FIG. 7. Alternatively, the polarization ellipse can be rotated while maintaining the corner cube 23 stationary as shown by the corner-cube module 32 in FIG. 6(b). A polarization rotator 28 (for example, a half-waveplate) can be used to rotate the polarization ellipse with respect to the stationary $E_{Sin}$ axis of the corner cube 23. The rotator 28 mounted in a rotatable fixture 31 can be rotated either manually or driven by a motor via the control cable 26B. A polarization insensitive beam director 30 is inserted in the output beam 24 path in order to avoid any line-of-sight obstructions in a small-sized module 32.

The orientation angle of the plane of polarization of the linearly polarized output beam 24 of FIG. 6 occurs at different angles depending upon the ellipticity and orientation of the input polarization ellipse. In order to obtain a prescribed orientation it is necessary to rotate the plane of polarization of the output beam by another polarization rotator 45 driven manually or by a motor via the control cable 43 as shown by the additional elements in FIG. 7 as compared to FIG. 6. The polarization rotators 45, 48 can be rotated either mechanically or non-mechanically (for example, an electro-optical rotator or a magneto-optical rotator). Inserted between the rotator 45 and the output beam 24 from the corner cube 23 is a polarization insensitive beam splitter 44. The split-off probe beam 42 comprising a very small fraction of the output beam 24 provides the sample beam 42 to the diagnostics-processor module 56 in FIG. 7(c). The processor module 56 is integrated to the corner-cube module 47 (or 49). The combination of the corner-cube and the controller modules results in a single unit polarization transformer. The purpose of the processor module 56 in FIG. 7(c) is to provide the appropriate drive signals for 26A (or 26B), 43, and 55. This is accomplished with an analyzer 50, an optical detector 52, and an electronic processor 54. The analyzer is rotated for a null signal beam 51 (the condition for a linearly polarized output bean 46 in FIG. 7(a) or (b)). The error-signal 53 into the controller 54 generates the appropriate drive signals 26A (or 26B), 43, 55 for the polarization rotators 45, 48 in FIG. 7(b), for the polarization rotator 45 and the corner cube 23 in FIG. 7(a), and for the analyzer 50 in 7(c). The processor module 56 can be used as well for the modules 27, 32 of FIG. 6. An example for the signal nulling process is described for FIG. 7(a). In the first cycle the corner cube 23 is rotated for a minimum error signal 53 from the detector 52, and then followed by a sequential rotation in the analyzer 50 to further minimize the error signal 53. Remarkably in supporting experiments, three to four cycles of sequential rotations in both the corner cube 23 and the analyzer 50 are sufficient in attaining a null signal in 53. The signal nulling-process can be performed either manually or computer-controlled in a continuous node.

Figure 7A:
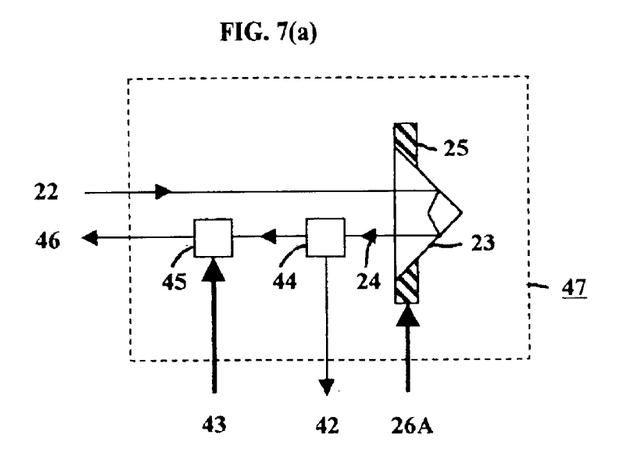
FIG. 7 shows the implementation of the standard polarization transformer for an off-axis beam irradiated corner cube with a diagnostics-processor module.
Figure 7B:
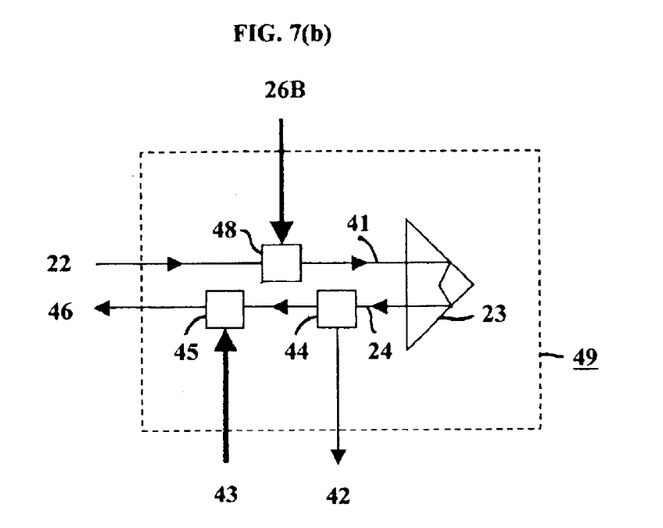
Figure 7C:
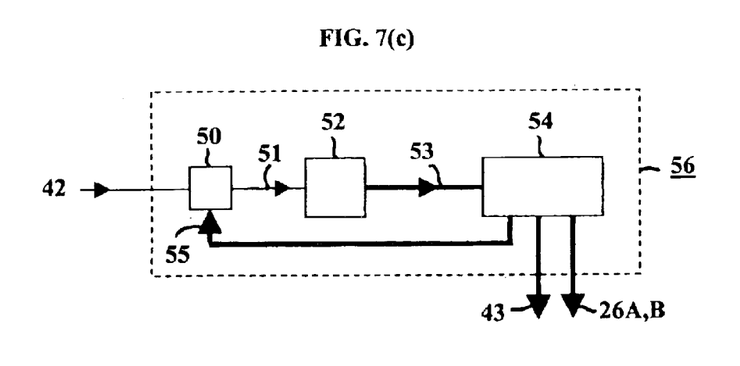

Transforming a linearly polarized beam into an elliptically polarized beam requires the plane of polarization to be rotated by 48 in FIG. 7(b) (or conversely the corner cube 23 in FIG. 7(a)) to an angle $\psi$ as given in FIG. 4 for a user specified ellipticity angle $\chi'$ in the output elliptically polarized beam. The output polarization orientation angle $\psi'$ of FIG. 4 can then be rotated by the rotator 45 to a user specified angle.

Transforming an elliptically polaried beam into a different elliptical polarized state requires a procedure for rotating the input polarization rotator 48 (or corner cube 23), the analyzer 50, and the output polarization rotator 43 in FIG. 7. The first stage in transforming from elliptical to elliptical is to linearize the input elliptically polarized beam in order to obtain the output polarization angle $\psi'$ from which the ellipticity angle $\chi$ can be obtained for the input beam from FIG. 4. To transform the initial $\chi$ into a different output $\chi'$ the input polarization angle $\psi$ requires adjustment to a new value designated by $\psi_n$ which according to (6) $S_3'$ is made equal to $\sin(2\psi')$ (where $\psi'$ is the user specified output ellipticity angle). The input polarization rotator 48 rotates the input polarization ellipses to the angle $\psi_n$ with respect to the $E_{Sin}$ axis of the corner cube 23. The orientation of the output polarization angle $\psi'$ is given by (7). Knowing $\psi'$ allows a final adjustment in the output polarization rotator 45 to the user specified orientation angle designated as $\psi'_n$. The diagnostics-processor module 56 in FIG. 7(c) can be computer-controlled to perform the various steps in transforming input linearly/elliptically polarized states into arbitrary elliptically polarized states in the output beam as well as in transforming input elliptically polarized states into linearly polarized states.

Figure 8A:
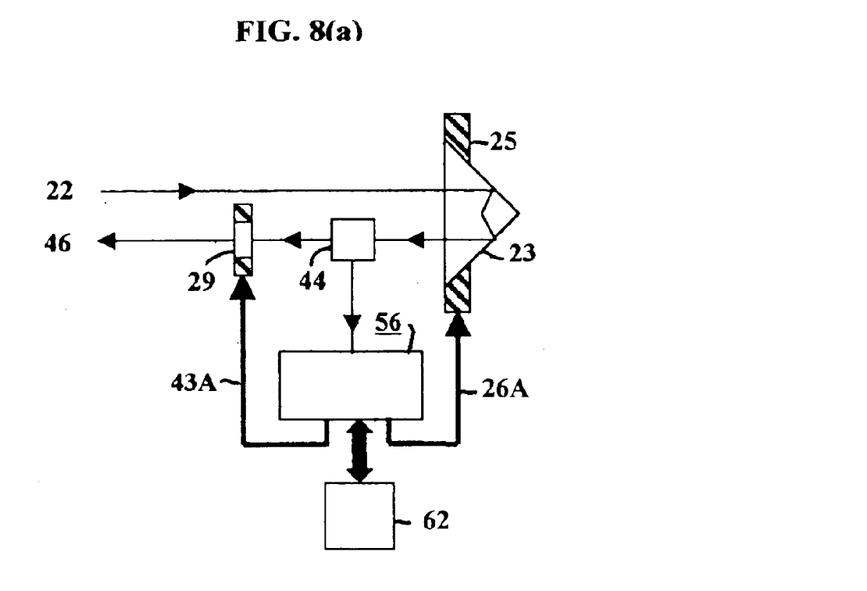
FIG. 8 shows the preferred implementation for the standard polarization transformer.
Figure 8B:
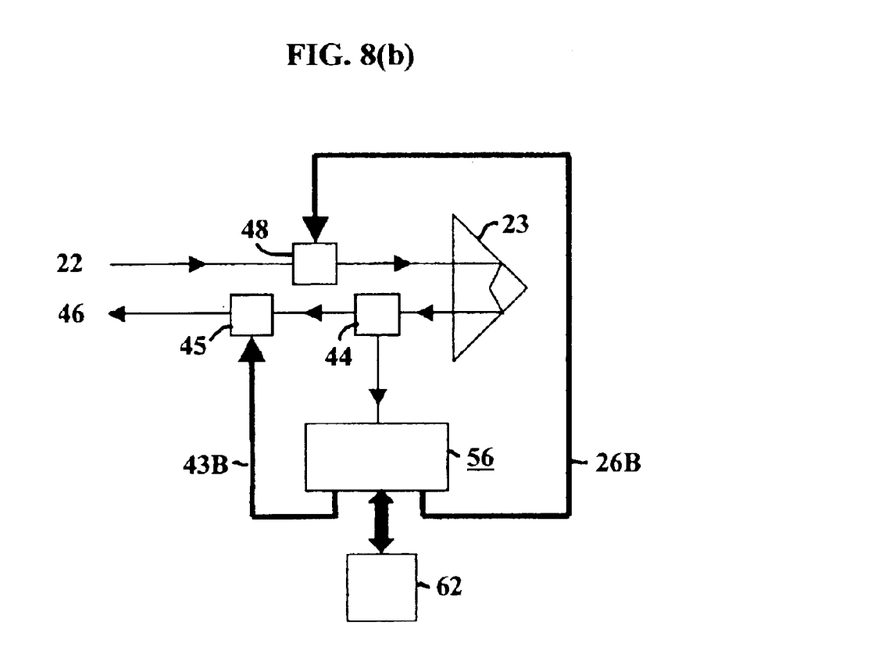

Two different configurations are shown for the preferred embodiment of the standard polarization transformer in FIG. 8. FIG. 8(a) employs motorized mechanical rotators for the corner cube rotator 25 and the output polarization rotator 29. In order for the input polarization ellipse (from input port 22) to remain stationary the corner cube 23 is rotated to obtain the optimum angle $\psi$ (from FIG. 4). The output polarization orientation $\psi'$ from the corner cube 23 is further rotated by the polarization rotator 29, (for example, by a half-waveplate) to the user specified angle at the output port 46. The polarization insensitive beam splitter 44 splits a small fraction of the output beam into the diagnostics-processor module 56 described previously in connection to FIG. 7(c). The computer 62 commands the processor module 56 to send out the drive signals via 26A to the corner cube rotator 25 and via 43A to the polarization rotator 29 to transform any input polarization state into a specified polarization state. FIG. 8(*b*) on the other hand employs non-mechanical rotators electro-optical (or magneto-optical) polarization rotators 48 in the input port 22 and rotator 45 at the output port 46. User specified polarization-state commands by the computer 62 directs the diagnostics-processor module 56 to send out drive signals 26B and 43B to polarization rotators 48 and 45, respectively.

The air-bean paths between optical components in FIGS. 6, 7, 8 and 9 can be replaced with fiber optical links between components. However, caution must be exercised because single-mode fibers are birefringent which means the initial polarization state of the light transmitting through the fiber can change due to varying environmental factors affecting the fiber. For this reason fiber length should be made short without bends, even then there may be spurious effects introduced in the polarization by the fiber connectors.

Figure 9A:
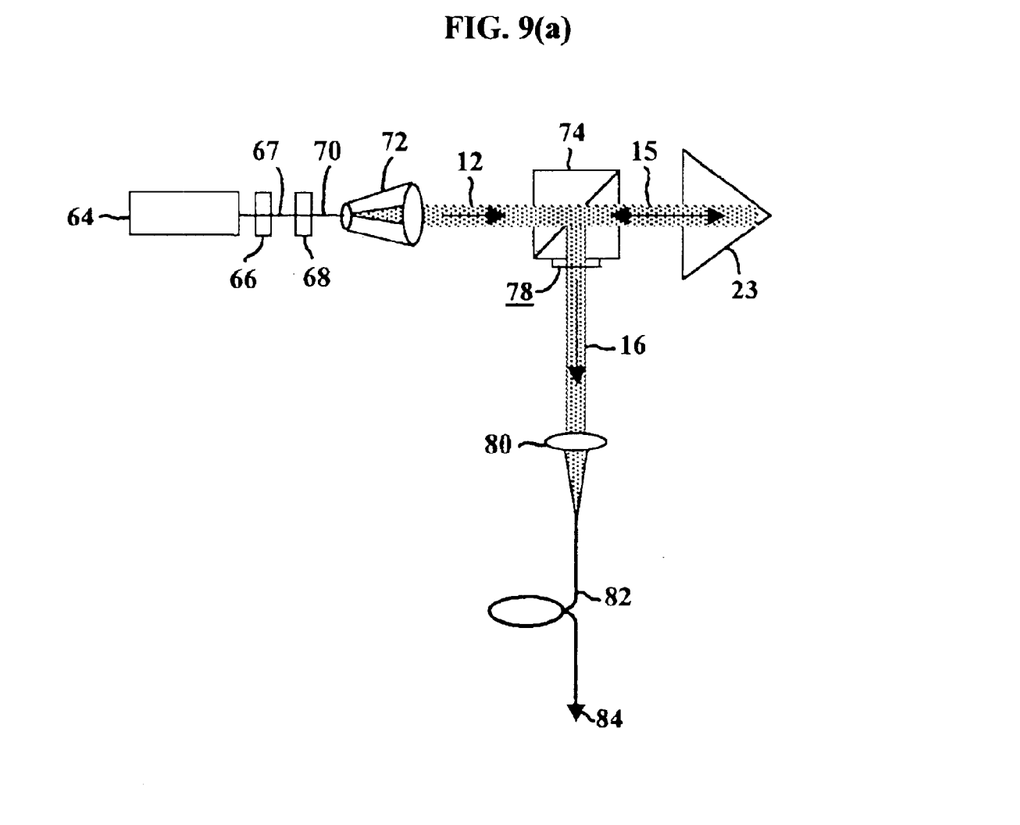
FIG. 9 shows the preferred implementation for the depolarizer.

The preferred embodiment for the depolarizer is shown in FIG. 9(*a*). A laser 64 provides a linearly polarized beam 67 via an isolator 66. The laser beam 67 is directed into a quarter-waveplate 68 whose axes are oriented 45° with respect to the polarization plane of the laser beam 67. The output from the quarter-waveplate 68 is a circularly polarized beam 70. If the beam 70 is deficient in spot size to irradiate symmetrically on-axis to the vertex of the corner cube facets, then a beam expander-collimator lens 72 is required to expand the beam 70 into a collimated beam 12 as indicated in FIGS. 9(*a*) and 3(*b*). A polarization insensitive bi-directional beam director 74 is interposed between the beam expander collimator lens 72 and the corner cube 23. The retro-reflected beam 15 from the corner cube 23 is depolarized and is ed by the beam director 74 (for example, a circulator or a beam splitter as drawn in the figure). A lens 80 interposed between the beam director 74 and the fiber 82 launches the depolarized beam 16 with the proper numerical aperture and spot size into the fiber input. The output beam 16 from the corner cube 23 is completely depolarized, however it is not temporally coherent.

Figure 9B:
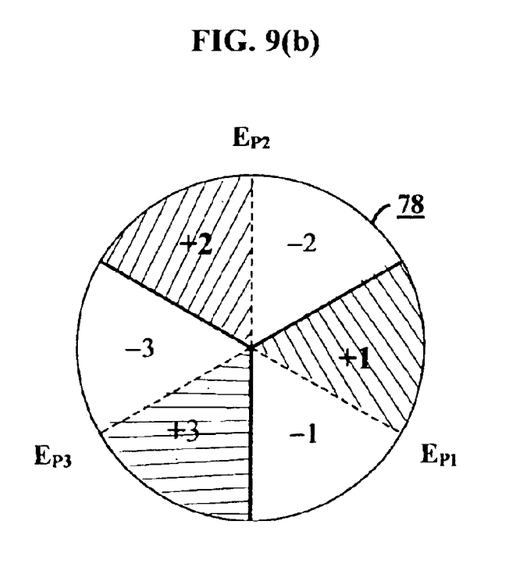

The output beam pattern from the corner cube corresponding to the pattern in FIG. 1 is re-drawn in FIG. 9(*b*). The triad sectors 1, 2, 3 are sub-divided by the $E_P$ axes into hexad regions shown with − and + signs corresponding to CW and CCW rotations in these regions, respectively. This means for a beamlet impinging the −2 hexad will propagate in the CW direction and exit the corner cube from the +3 hexad as indicated in FIG. 2(*b*); whereas, for a beamlet impinging the +2 hexad will propagate in the CCW direction and exit from the −1 hexad. For a broad-size beam on-axis to the corner cube all hexed regions are uniformly irradiated thereby resulting in simultaneous CW and CCW rotations in the beamlets. It can be shown there is a $\Delta\phi=0.81\pi$ radian phase difference between the beamlets emerging from the CW and CCW output hexad regions. The beamlets from the clear CW regions in FIG. 9(*b*) lag in phase by $\Delta\phi=0.81\pi$ from the beamlets from the cross-hatched CCW regions. Since the output beam 15 from the corner cube 23 is collimated, the pattern of FIG. 9(*b*) depicts the actual cross-section of the depolarized beam 16. The geometrical pattern of the beam allows a means to equalize the phase shift of the CCW and CW beamlets. A delay of a fractional wave period in the output CCW hexads could correct the composite wavefront of the depolarized beam into a temporally-coherent wavefront. This can be accomplished by increasing the glass thickness Δd in the geometric regions corresponding to the CCW hexads (the +1, +2, +3 cross-hatched regions in FIG. 9(*b*)). The pattern 78 of alternate CCW hexads can be evaporated or sputtered directly onto the output port of the beam director 74 in FIG. 9(*a*) in registry to the output beam pattern from the corner cube 23. The required thickness Δd is dependent upon the transit time of the wave in the deposited CCW hexad patterned layer as compared to the transit time for an air beam traversing the same distance Δd. The thickness of the compensating layer is given by

$$\Delta d = \left(\frac{\Delta\varphi}{2\pi}\right)\frac{\lambda}{n-1} \quad (10)$$

where $\lambda$ is the wavelength of the laser, and the refractive index is taken as n=1.5 (for an optically transparent dielectric). For the phase shift $\Delta\phi=0.817\pi$ and for a $\lambda=1550$ nm laser the layer thickness is Δd=1256-nm Thus, by employing the deposited patterned layer 78 on the output port of the beam director 74 in registry to the output beam pattern of the corner cube 23, the otherwise temporally incoherent depolarized beam becomes transformed into a temporally-coherent depolarized air-beam.

The composite beam pattern from the corner cube is completely depolarized, however the beamlets from each of the hexad patterns of the beam have different linear polarization states. For beam application purposes there is a need to spatially homogenize the polarization states. This can best be accomplished with a beam homogenizer optical element or a single mode optical fiber that scrambles the image content of the hexad patterns. The fiber is also a homogenizer since images cannot be transmitted through a fiber, spatial information of the hexad pattern is lost in the fiber and the initial polarization states of the patterns become spatially mixed in the fiber. Real fibers having circular geometry about its axis are bimodal meaning that orthogonal polarization states can propagate simultaneously in the fiber due to birefringence caused by the perturbations in the geometry, material composition, or strain. Perturbations occur randomly along the length of the fiber. All six polarization states of the output beam from the corner cube (which becomes the input beam to the fiber) become equally affected by the birefringence perturbations. Because of the multiplicity of zig-zag paths of meridional rays and helical paths of skew rays in a fiber, all beamlets of the input beam to the fiber are randomly scattered in a manner such that they all experience the same birefringence irrespective of their initial spatial starting point on the entrance aperture of the fiber. Once a depolarized beam is launched into a fiber the beam thereafter propagates without change in the depolarized state. Thus, a depolarized beam is not affected by the birefringence in the fiber, however the temporal coherence of the beam could be affected. The temporally coherent air-beam 16 launched into the fiber in FIG. 9(*a*) is not adversely affected at the output 84 for a short length fiber; however, polarization mode dispersion due to birefringence in a long length of fiber could degrade the temporal-coherence of the beam by introducing a phase difference in the orthogonal field components in the polarized beamlet states that make up the depolarized beam.

In summary a standard polarization transformer is implemented by utilizing a corner cube that is irradiated with an off-axis probe beam; whereas, a depolarizer is implemented by irradiating an on-axis beam to the corner cube. In order to obtain 100% conversion efficiency in the depolarizer and the full ±45° ellipticity angle range in the transformer, the corner cube is manufactured from a glass having a refractive index substantially centered about $n_0$=1.76748. To achieve the desired output polarization state in the transformer, angular-control in orientation is required between the polarization ellipse of the input beam and the corner cube; whereas for the depolarizer, a circularly polarized input beam is required. While my above description contains many specifications, these should not be construed as limitations on the scope of the invention, but rather as an exemplification of several preferred embodiments thereof.

I claim:

1. A method for utilizing a corner cube in a polarization transformer, comprising,
    (a) an input polarization light beam irradiating said corner cube; and
    (b) a polarization transformed output beam retroreflecting from said corner cube.

2. The method of claim 1, wherein:
    (a) said input light beam is a probe beam irradiating one facet of said corner cube whereby said probe beam is off-set from the vertex of said corner cube for the standard polarization transformer;
    further including:
    (b) a rotation means for adjusting the relative angle ψ between the reference axis of said corner cube and the polarization orientation vector of said probe beam by rotating the input polarization rotator or by rotating said corner cube; and
    (c) a rotation means for adjusting polarization orientation angle of said output beam from said corner cube by rotating the output polarization rotator.

3. The method of claim 2, further including:
    (a) a diagnostics processor module integrated in combination with the corner-cube module;
    (b) a polarization insensitive beam splitter providing a small fraction of said output beam as a sample signal to said diagnostics processor module whereby said signal is processed to establish the required rotation angles for said rotators and thereby attain a specified polarization state for said output beam; and
    (c) a computer directing polarization state specifications into said diagnostics processor module;
    wherein:
    (d) said diagnostics processor module provides drive voltages for said rotators;
    (e) said corner cube is fabricated from a glass having substantially a refractive index centered about $n_0=1.76748$;
    (f) said input beam is substantially at normal incident to said corner cube; and
    (g) said output beam is retroreflected by total internal reflection from the corner cube facets.

4. The method of claim 1, wherein:
    (a) said polarization transformer is a depolarizer providing a depolarized output beam for said transformed output beam;
    (b) said input light beam is a circularly-polarized beam irradiating symmetrically on axis to the vertex of the corner cube facets; and
    (c) a polarization insensitive bi-directional beam director steers said depolarized output beam away from the path of said circularly polarized input beam.

5. The method of claim 4, further including:
    (a) a beam homogenizer scrambling a spatial hexad pattern of said depolarized output beam; and
    (b) a dielectric layer pattern of alternate hexads deposited on the output port of said beam director in spatial registry to the beam pattern of said output beam whereby beamlets of said output beam are equalized in phase thereby resulting in temporal coherence of said depolarized output beam;
    wherein:
    (c) said corner cube is fabricated from a glass having substantially a refractive index centered about $n_0=1.76748$;
    (d) said input beam is substantially at normal incident to said corner cube; and
    (e) said output beam is retroreflected by total internal reflection from said corner cube facets.

6. A standard polarization transformer, comprising:
    (a) a corner cube;
    (b) an input polarized light beam irradiating said corner cube; and
    (c) a polarization transformed output beam from said corner cube.

7. The transformer of claim 6, wherein said output beam is focused to a small spot of proper numerical aperture and is launched into an optical fiber.

8. The transformer of claim 6, wherein air-beam paths between optical components are replaced with fiber optical links.

9. The transformer of claim 6, wherein:
    (a) said input light beam is a probe beam irradiating one facet of said corner cube whereby said probe beam is off-set from the vertex of said corner cube;
    further including:
    (b) a rotation means for adjusting relative angle ψ between the reference axis of said corner cube and the polarization orientation vector of said probe beam by rotating the input polarization rotator or by rotating said corner cube; and
    (c) a rotation means for adjusting polarization orientation angle of said output beam from said corner cube by rotating the output polarization rotator.

10. The transformer of claim 9, further including:
    (a) a diagnostics processor module integrated in combination with the corner-cube module for said transformer;
    (b) a polarization insensitive beam splitter providing a small fraction of said output beam as a sample signal to said diagnostics processor module whereby said signal is processed to establish the required rotation angles for said rotators and thereby attain a specified polarization state for said output beam; and (c) a computer directing polarization state specifications into said diagnostics processor module;

wherein:

(d) said diagnostics processor module provides drive voltages for said rotators;

(e) said corner cube is fabricated from a glass having substantially a refractive index centered about $n_0=1.76748$;

(f) said input beam is substantially at normal incident to said corner cube; and (g) said output beam is retroreflected by total internal reflection from the corner cube facets.

11. The transformer of claim 10, wherein air-beam paths between optical components are replaced with fiber optical links.

12. A depolarizer, comprising:

(a) a corner cube;

(b) an input polarized light beam irradiating said corner cube; and (c) a depolarized output beam from said corner cube.

13. The depolarizer of claim 12, further including:

(a) a laser module containing an isolator and a quarter-waveplate and a beam expander collimator lens integrated in combination with said corner-cube module for the depolarizer unit;

wherein:

(b) a linearly polarized laser beam incident to said quarter-waveplate whose axes are at 45° with respect to the polarization plane of said laser beam generates a collimated circularly polarized beam for said input polarized input beam.

14. The depolarizer of claim 12, wherein said depolarized output beam is focused to a small spot of proper numerical aperture and is launched into an optical fiber.

15. The depolarizer of claim 12, wherein air-beam paths between optical components are replaced with fiber optical links.

16. The depolarizer of claim 12, wherein:

(a) said input light beam is circularly-polarized irradiating symmetrically on axis to the vertex of the corner cube facets;

further including:

(b) a polarization insensitive bi-directional beam director steers said depolarized output beam away from the path of said circularly polarized input beam.

17. The depolarizer of claim 16, further including;

(a) a beam homogenizer scrambling a spatial hexad pattern of the steered depolarized output beam; and (b) a dielectric layer pattern of alternate hexads deposited on the output port of said beam director in spatial registry to the beam pattern of said output beam whereby beamlets of said output beam are equalized in phase thereby resulting in temporal coherence of said depolarized output beam;

wherein:

(c) said corner cube is fabricated from a glass having substantially a refractive index centered about $n_0=1.76748$;

(d) said input beam is substantial at normal incident to said corner cube; and (e) said output beam is retroreflected by total internal reflection from said corner cube facets.

18. The depolarizer of claim 17, wherein said depolarized output beam is a collimated air beam.

19. The depolarizer of claim 17, wherein the collimated depolarized output beam focused to a small spot and proper numerical aperture is launched into an optical fiber.

20. The depolarizer of claim 19, wherein air-beam paths between optical components are replaced with fiber optical links.

* * * * *